No. 819,948. PATENTED MAY 8, 1906.
A. SWASEY & G. L. FECKER.
OPTICAL INSTRUMENT.
APPLICATION FILED NOV. 22, 1905.
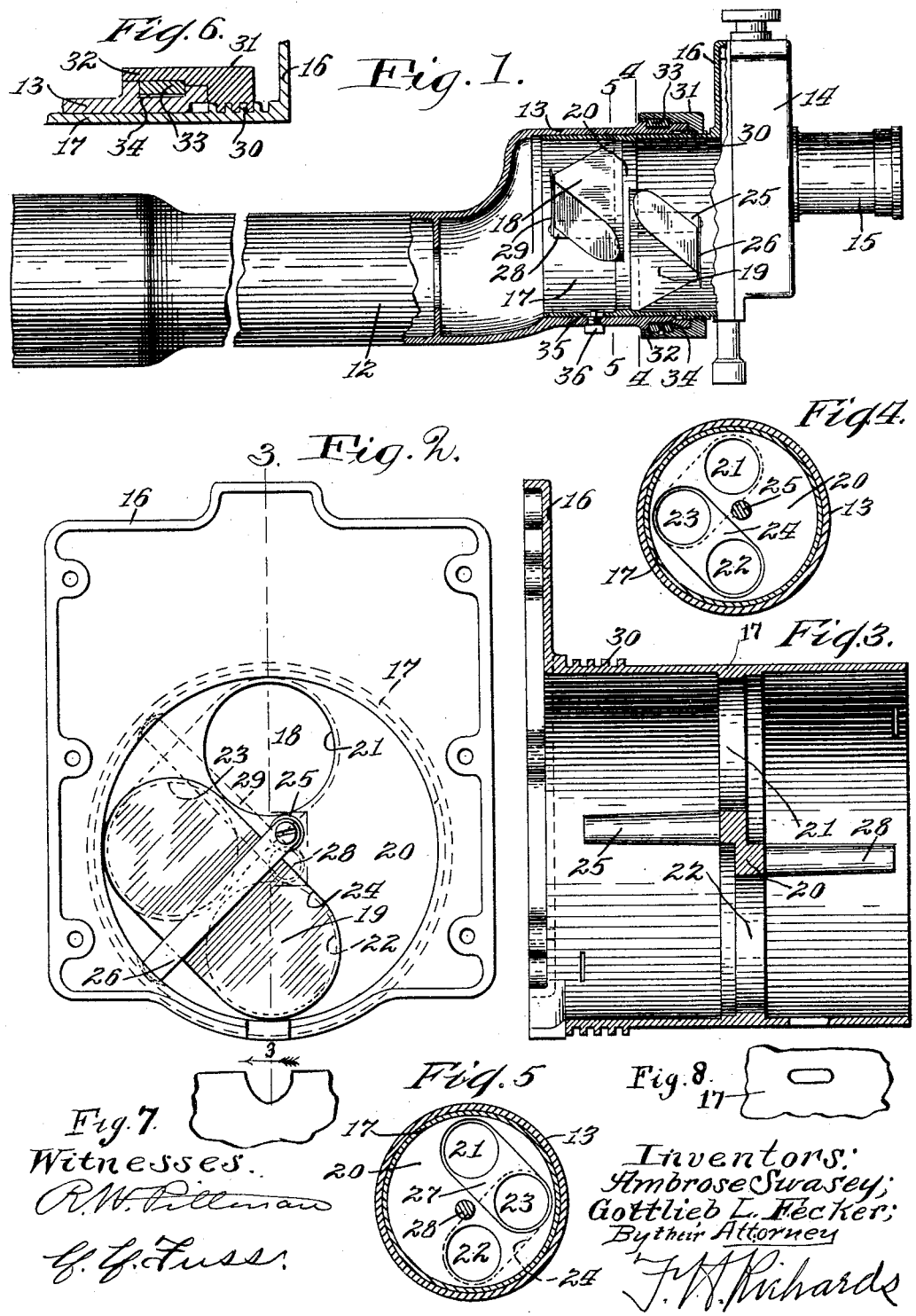
Witnesses.
Inventors:
Ambrose Swasey;
Gottlieb L. Fecker;
By their Attorney

UNITED STATES PATENT OFFICE.

AMBROSE SWASEY AND GOTTLIEB L. FECKER, OF CLEVELAND, OHIO, ASSIGNORS TO THE WARNER & SWASEY COMPANY, OF CLEVELAND, OHIO, A CORPORATION OF OHIO.

OPTICAL INSTRUMENT.

No. 819,948.      Specification of Letters Patent.      Patented May 8, 1906.

Application filed November 22, 1905. Serial No. 288,617.

*To all whom it may concern:*

Be it known that we, AMBROSE SWASEY and GOTTLIEB L. FECKER, citizens of the United States, residing at Cleveland, in the county of Cuyahoga and State of Ohio, have invented certain new and useful Improvements in Optical Instruments, of which the following is a specification.

This invention relates to optical instruments, such as telescopes and the like, and has for an object to provide means for removably supporting the optical elements, such as prisms or other reflecting means, so that the elements can be moved longitudinally without affecting their position transversely of the instrument and that the optical elements can be replaced and will be in the exact former position.

The invention is particularly adapted for use in telescopes employing Porro prisms for deflecting the rays in order to shorten the distance between the eyepiece and objective-lenses.

In the drawings, illustrating a telescope embodying the present invention, Figure 1 is a side elevation with the intermediate portions of the tubes in section to show the interior arrangement of the prisms and supporting-wall. Fig. 2 is an end elevation of the holder. Fig. 3 is a transverse section on the line 3 3 indicated in Fig. 2. Fig. 4 is a transverse section on the line 4 4 indicated in Fig. 1. Fig. 5 is a transverse section on the line 5 5 indicated in Fig. 1, and Fig. 6 is an enlarged view, in longitudinal section, of the screw adjustment of the holder. Fig. 7 is a fragmentary bottom view of the parts shown in Fig. 2, and Fig. 8 is a fragmentary bottom view of the member shown in Fig. 3.

The invention is shown as applied to a single-barrel telescope connected with a micrometer-box carrying the eyepiece. The telescope is shown as having a main body-portion 12, that has an enlarged tubular portion 13, whose axis is offset from the axis of the part 12, but parallel therewith. The purpose of this offset is to provide for the double reversal of the focal line caused by suitable reflecting elements, in the present instance comprising two Porro prisms. A micrometer-box is indicated generally by reference-numeral 14 and forming no part of the present invention is not specifically shown, and no further description thereof is necessary, except that it is provided with an eyepiece 15. The front face of the micrometer-box is suitably attached to an enlarged rectangular portion 16, that is connected to or preferably integral with a tube 17 of a diameter to snugly fit into the body portion 13 of the telescope. The tube 17 constitutes part of a holder for the optical elements, in this case Porro prisms 18 and 19. These prisms are rigidly mounted in the tube 17, one of them receiving the rays through the telescope-tube 12 and deflecting them twice into the other prism 18, the latter prism after double reflection projecting the rays into the eyepiece 15. These prisms are shown as supported solely by a transverse disk or wall 20, located in the bore of the tube 17 at an intermediate part, which may be integral therewith, if desired. The wall 20 is provided with three apertures, one of them, 21, at the upper part in alinement with the eyepiece 15, another aperture 22 being at the lower part of the wall and in alinement with the axis of the tube 12. A third aperture 23 is disposed to one side of these apertures in the wall, the lines joining the center of this aperture with the other two meeting at a right angle. The rays of light, as will be understood, enter through the aperture 22 and are twice deflected by the prism 19, then pass through the aperture 23 to the prism 18, and are by the latter prism directed through aperture 21 to the eyepiece 15.

On the rear face of the wall 20 is a channeled portion or recess 24, including both of the apertures 22 and 23 and forming a seat for the prism 19, that snugly fits thereon. The prism is retained in such seat in the wall by means of a post 25, extending rearward from the wall 20 and having secured at its extremity a plate-spring 26 bearing on the ridge of the prism and holding it in position. On the opposite or front face of the wall 20 is a recess or seat 27, including the apertures 21 and 23, in which recess is seated the prism 18, that snugly fits therein. This latter prism is retained in position by means of a post 28, extending forward and having secured to its extremity a plate-spring 29, that engages the ridge of the prism 18 and retains it in position.

In order to adjust the eyepiece-lenses with relation to the objective without disturbing the Porro prisms, the tube 17, carrying the Porro prisms and rigidly connected with the micrometer-box and eyepiece, is provided with means whereby these members can be moved longitudinally, but will be prevented from any transverse movement or rotation. The tube 17 is shown as provided with external screw-threads 30 adjacent the offset portion 16. A collar 31 is provided with internal screw-threads snugly engaging the screw-threads 30 of the tube, which collar has a sleeve portion 32 engaging the outer face of the tube 13. Rotation of the collar and sleeve will evidently advance them longitudinally on the inner tube 17. In order to cause the inner tube to move relative to the tube 13 upon such rotation, a ring 33 is secured to the inner face of the sleeve 32 and engages an annular groove 34 in the tube 13. By this latter engagement the rotation of the sleeve 32 will prevent it and the collar from longitudinal movement relative to the tube 13. Therefore the rotation of the sleeve by reason of its screw-threaded engagement with the inner tube 17 will cause the latter to advance in the tube if prevented from rotating. Suitable means is also provided for permitting the inner tube to move axially while preventing its rotation. The inner tube is shown as provided with a longitudinal slot 35, into which projects the end of a screw 36, working in a threaded aperture in the tube 13. By this means the rotation of the sleeve 32 will move the inner tube, and consequently the prisms and micrometer-box with the eyepiece, relative to the tube-body portion 12, as desired.

When it is desired to remove the prisms for any reason, such as for inspection or cleaning or replacement, it is only necessary to screw outward the screw 36 until it withdraws from the slot 35. Thereupon the sleeve 32 can be rotated to move forward until the threads are disengaged, when the inner tube 17 may be drawn entirely out of the tube 13, its movement being no longer limited by the screw 36. When the prism-carrying tube is replaced in the body portion, it is turned until the slot 35 registers with the screw and the latter is inserted in the slot. This, it will be seen, will bring the prisms to their precise former position relative to the transverse arrangement of the body portion, and the longitudinal position is determined by the adjustment of the regulating-sleeve 32. It will be further seen that the prisms are carried solely by the transverse wall of the tube 17 and are thus independent of any fixed or any other movable part of the instrument. When the tube 17 is removed, they are carried with it, and upon its being returned to its former position they will occupy their precise former position.

What we claim is—

1. In an optical instrument, the combination of a tubular body, a tube slidable in said body, but prevented from rotating therein, a wall in said tube provided with three apertures, the wall having a recess in one face including two of such apertures, an optical element seated in such recess, a post projecting from said side of the wall, a clip secured on said post and clamping said optical element in said seat, the wall having a recess on its opposite face including the third aperture, and one of said other apertures, an optical element seated in such recess, a post projecting from such latter face of the wall, and a clip secured to said latter post and engaging said latter optical element to secure it in position.

2. In an optical instrument, the combination of a tubular body portion, a tube slidable in said body portion, a micrometer-box having a rectangular outline, said tube having an extension at one end arranged to register with said rectangular box, a transverse wall on the interior of said tube, an optical element carried by said wall and arranged in focus with said eyepiece, a second optical element carried by said wall and arranged in focus with said optical element and also in focus with the tubular body portion, means for adjusting the inner tube in the body portion longitudinally, and means for preventing rotation of the inner tube in the body portion.

3. In an optical instrument, the combination of a tubular body, a tube slidable in the body, Porro prisms carried by the tube, said tube having a screw-threaded portion, a sleeve having an internal threaded portion engaging the threaded portion of the tube, a ring on the inner face of said sleeve, the body having an annular channel engaging said ring at such channeled portion.

4. In an optical instrument, the combination of a tubular body, a tube slidable in said body but prevented from rotating therein, a wall in said tube provided with three apertures, the wall having a recess in one face including two of such apertures, a Porro prism having its base seated in such recess, a post projecting from said side of the wall, a clip secured on said post and clamping said prism in said seat, the wall having a recess on its opposite face including the third aperture and one of said other apertures, a Porro prism having its base seated in such recess, a post projecting from such latter face of the wall, and a clip secured to the latter post and engaging said latter prism to secure it in position.

5. In an optical instrument, the combination of a tubular body portion, a tube slidable in said body portion, a micrometer-box having a rectangular outline, said tube having an extension at one end arranged to register with said rectangular box, a transverse wall on the interior of said tube, a Porro prism carried by said wall and arranged in focus with said eyepiece, a second Porro prism carried by said wall and arranged in focus with said prism and also in focus with the tubular body portion, means for adjusting the inner tube in the body portion longitudinally, and means for preventing rotation of the inner tube in the body portion.

AMBROSE SWASEY.
GOTTLIEB L. FECKER.

Witnesses:
L. B. STAUFFER,
F. H. RICE.